May 24, 1938.  G. W. GRISDALE  2,118,081
RECORDING INSTRUMENT
Filed Dec. 12, 1934  7 Sheets-Sheet 1
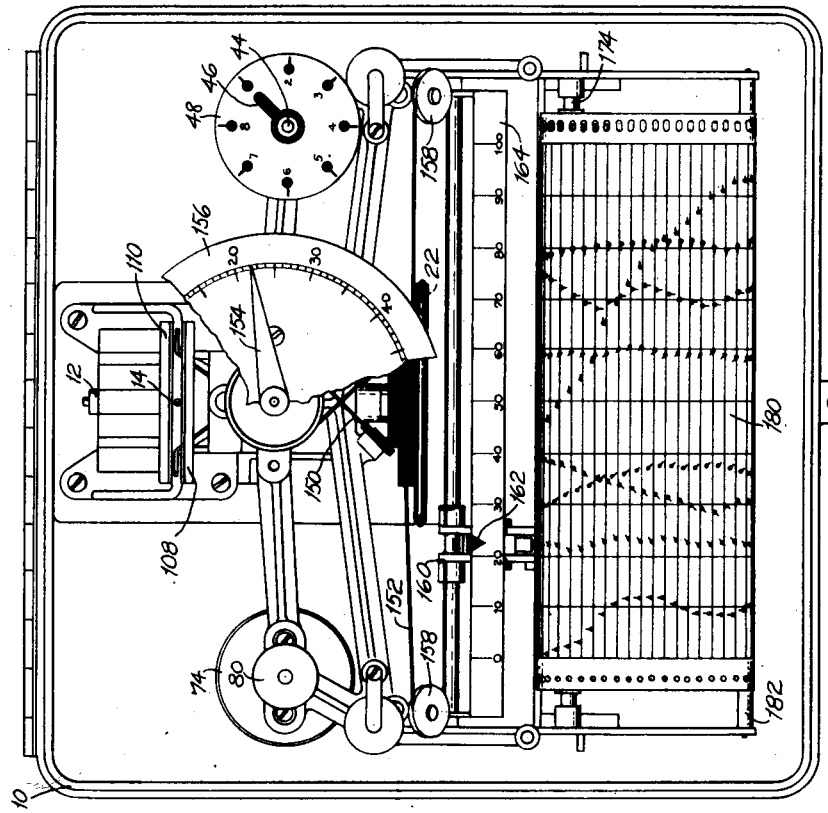
Inventor
George W. Grisdale
by [signature]
Attorney May 24, 1938. G. W. GRISDALE 2,118,081
RECORDING INSTRUMENT
Filed Dec. 12, 1934 7 Sheets—Sheet 2

Inventor
George W. Grisdale
by M. W. McCauley
Attorney

May 24, 1938.　　　G. W. GRISDALE　　　2,118,081
RECORDING INSTRUMENT
Filed Dec. 12, 1934　　　7 Sheets-Sheet 3
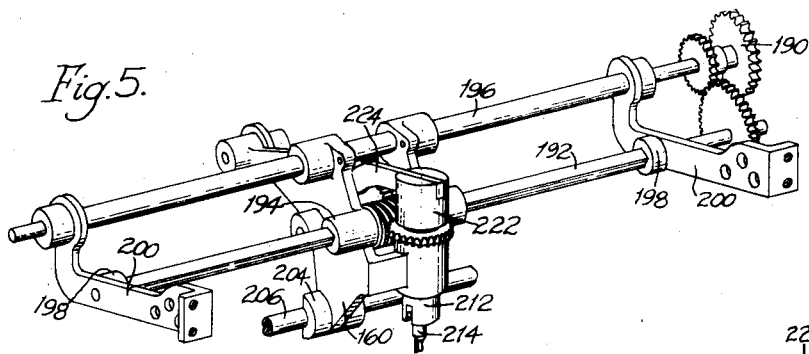
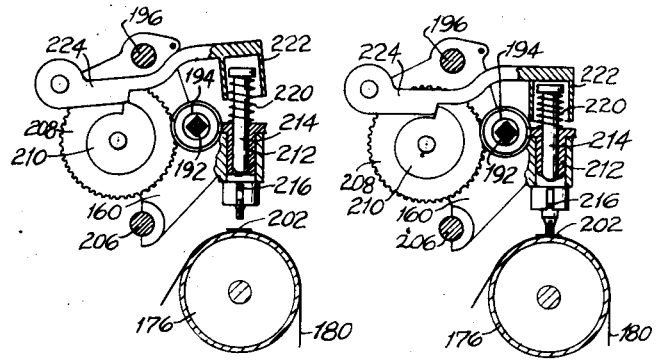
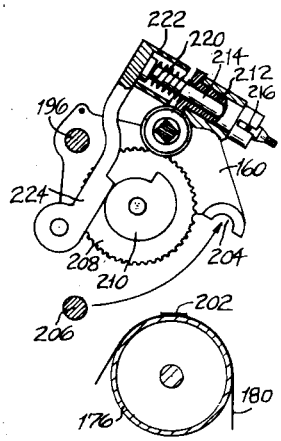
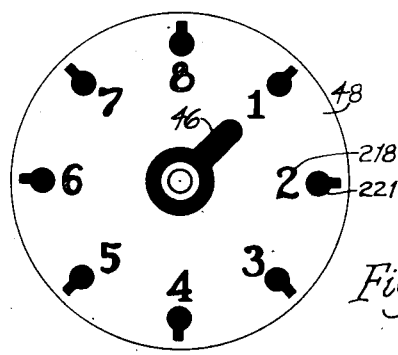
Inventor
George W. Grisdale
by
Attorney

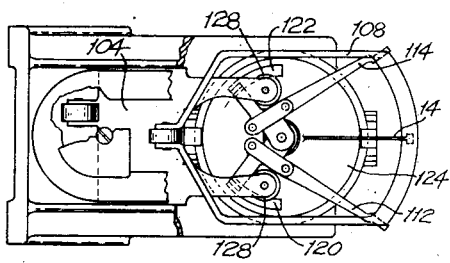
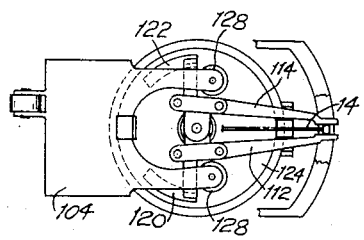
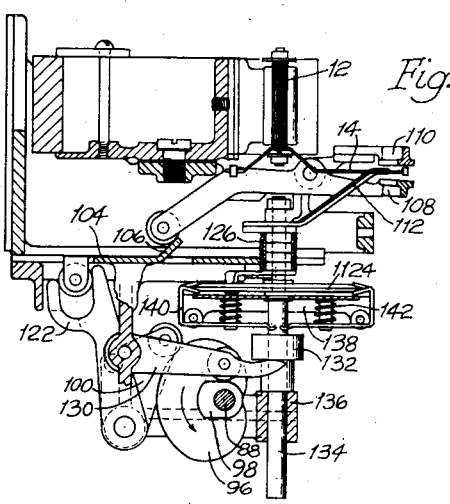
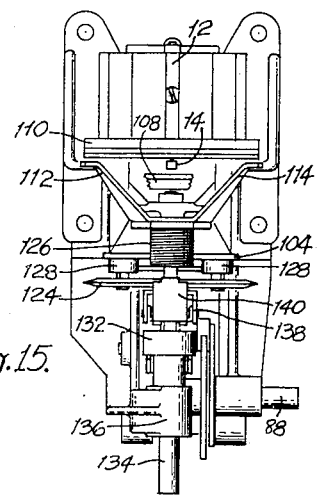
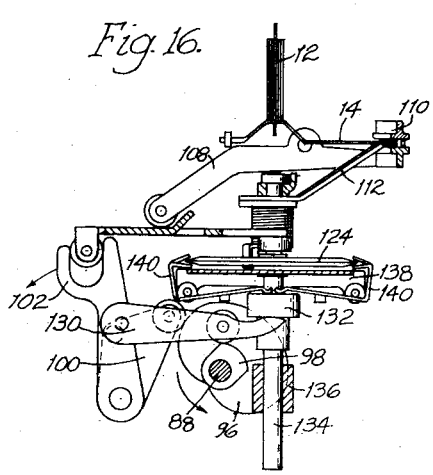
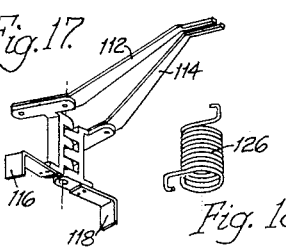

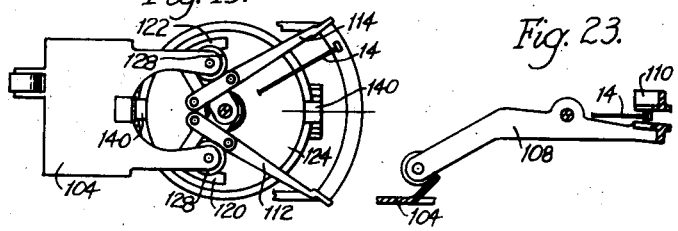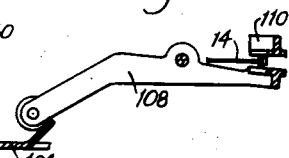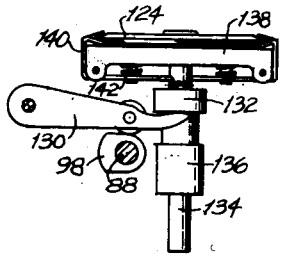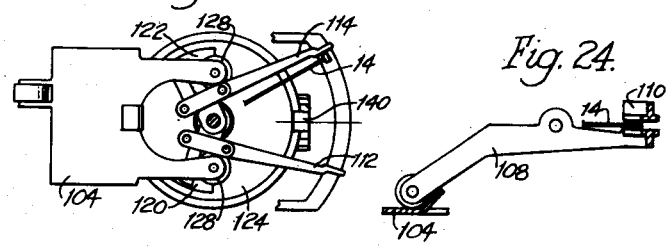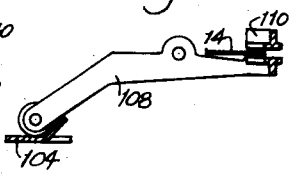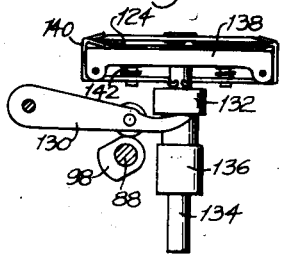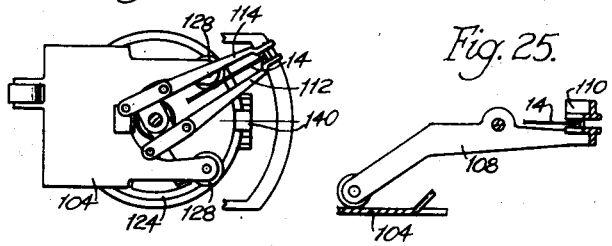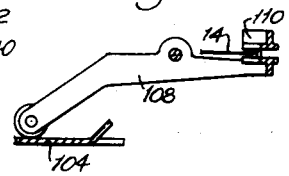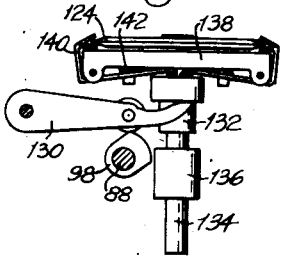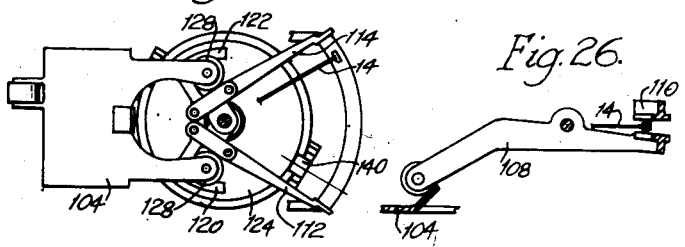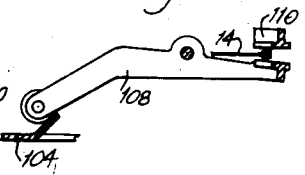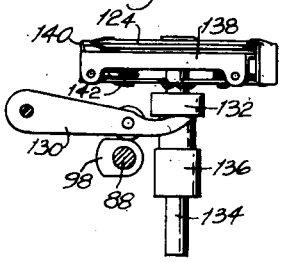

May 24, 1938.　　G. W. GRISDALE　　2,118,081
RECORDING INSTRUMENT
Filed Dec. 12, 1934　　7 Sheets-Sheet 6
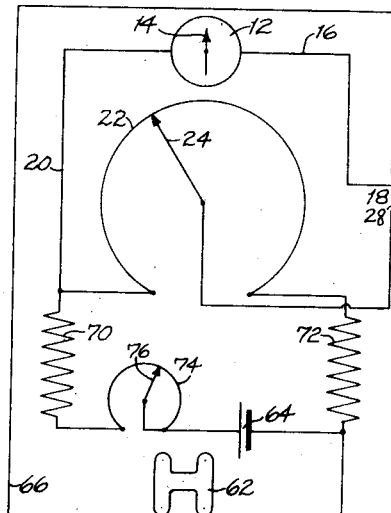
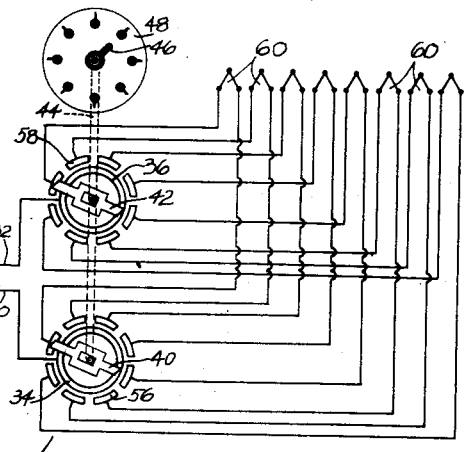
Fig. 35.
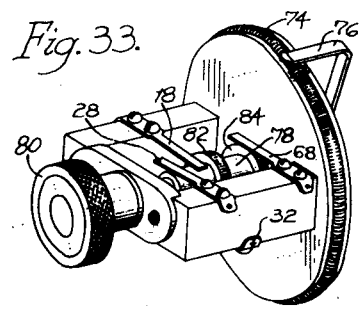
Fig. 32.
Fig. 33.
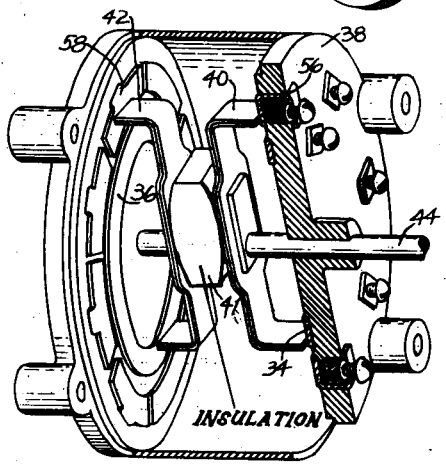
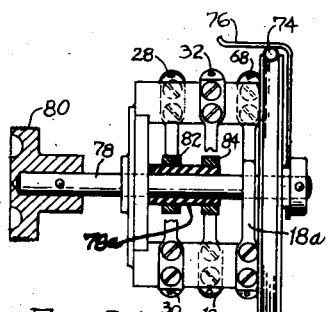
Fig. 34.
Fig. 31.
Inventor
George W. Grisdale
by　　　　　　　
Attorney May 24, 1938.  G. W. GRISDALE  2,118,081
RECORDING INSTRUMENT
Filed Dec. 12, 1934  7 Sheets-Sheet 7
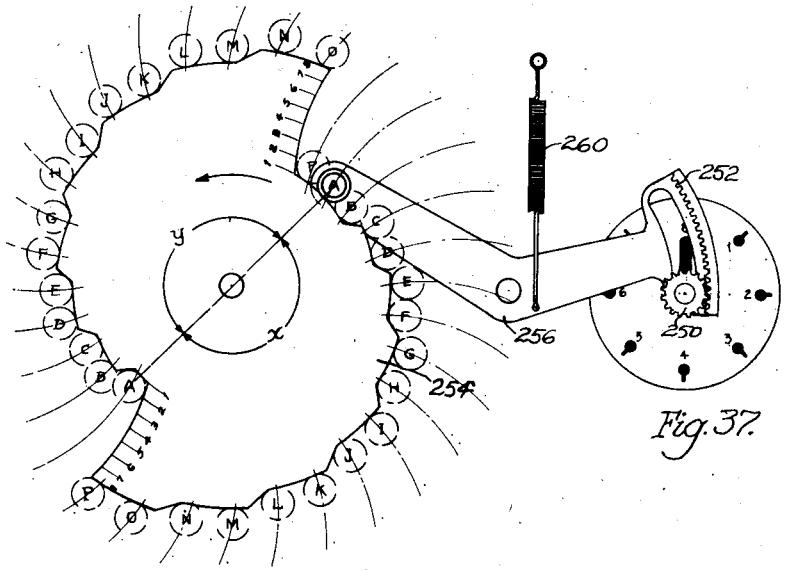
Fig. 38.
Fig. 37.
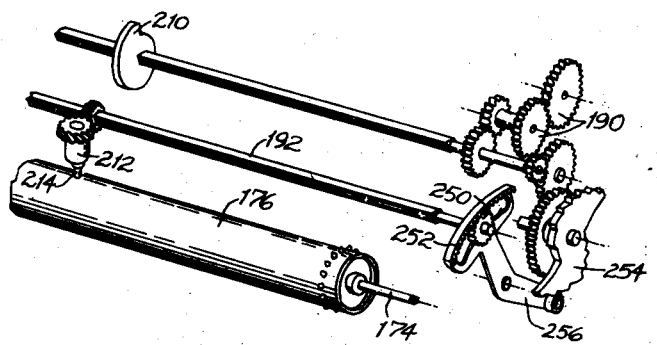
Fig. 36.
Inventor
George W. Grisdale
by M. W. McConkey
Attorney Patented May 24, 1938

2,118,081

UNITED STATES PATENT OFFICE 2,118,081

RECORDING INSTRUMENT

George W. Grisdale, Chicago, Ill.

Application December 12, 1934, Serial No. 757,095

11 Claims. (Cl. 234—67)

This invention relates to instruments such as potentiometers, and in some of its phases more particularly to recording instruments, and is illustrated as embodied in a multiple recording potentiometer adapted to record on a single chart the values determined by several control devices connected to the instrument by electrical wiring or other equivalent remote control systems.

An object of the invention is to provide a simplified printing or recording mechanism for such an instrument, utilizing a single printing element for all of the several records made on the chart. Preferably this is accomplished by forming the printing element to print a non-symmetrical character which is turned to different angular positions to distinguish the several records.

Various features of the invention relate to the provision of a novel carriage controlled by the impulses received in the instrument and shifted accordingly crosswise of the chart to position the printing element, to the angular turning of the printing element in synchronism with switches or the like for successively connecting the instrument to the different remote control circuits, to the provision on the above-mentioned carriage of improved means for percussively operating the printing element, and to the provision of a novel indicator operated synchronously with the printing element and the switch connections or their equivalents.

In one of two embodiments shown in the drawings, the printing element is rotated into a series of different angular positions each constituting a pattern representing one of the series of values being recorded. In the other embodiment, novel means is provided to give different combinations of the different angular positions, thus providing patterns for a large number of such series of values.

Another important feature relates to controlling shiftable recording or indicating means, such as the above-described carriage, by power means controlled by a sensitive pointer, or the like, without interfering with the sensitivity of the instrument. Preferably a light disk or the like is set by feelers engaging the pointer, and the carriage-shifting mechanism or equivalent operated means is connected to the disk by a novel clutch while the disk is shifted back to a neutral position by power.

The above and other objects and features of the invention, including various novel combinations of parts and desirable particular constructions, will be apparent from the following description of the illustrative embodiment shown in the accompanying drawings, in which:

Figure 1 is a front elevation of the instrument, with the front removed and part of the indicator dial broken away;

Figure 2 is a section through the instrument on a plane just inside one end wall of the casing;

Figure 5 is a perspective showing the shiftable carriage and associated parts;

Figure 3:
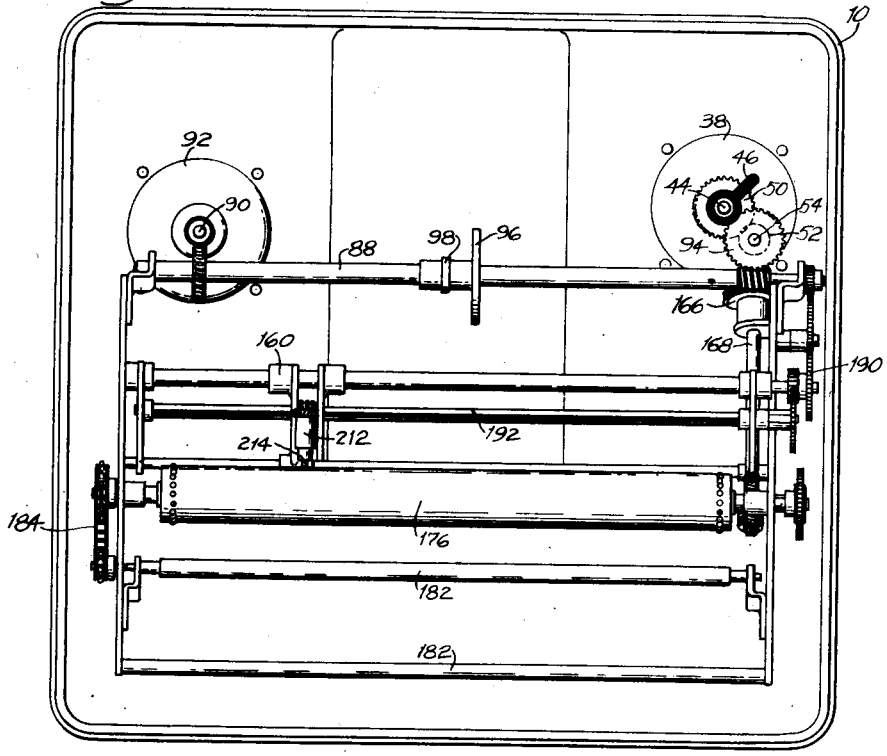
Figure 3 is a section showing in plan view the driving means for the printing mechanism.

Figures 6, 7, and 8 are sections through the carriage, in different positions;

Figure 9 is a perspective of the printing plunger;

Figure 10 is an elevation showing the end of the plunger;

Figure 11 is an elevation of the indicator and dial associated with the printing plunger;

Figures 12 and 13 are plan views of the feeler mechanism, in open and closed positions respectively;

Figure 14 is a vertical section through the feeler mechanism and associated parts;

Figure 15 is a front elevation of the parts shown in Figure 14;

Figure 16 is a view corresponding to the lower part of Figure 14, but showing the clutch open;

Figure 17 is a perspective view of the feelers;

Figure 18 is a perspective view of the torsion spring which closes the feelers;

Figures 19, 20, 21, and 22 are plan views of the feeler mechanism at successive steps in its cycle;

Figures 23, 24, 25, and 26 are sections showing the pointer-gripping mechanism at points in its cycle corresponding respectively to Figures 19, 20, 21, and 22;

Figures 27, 28, 29, and 30 are sections showing the clutch mechanism, at points in its cycle corresponding respectively to Figures 19, 20, 21, and 22;

Figure 31 is a perspective, partly broken away in section, showing the switch for successively connecting the instrument to different ones of a series of pyrometers or other control devices;

Figure 32 is a perspective of a combination rheostat and switch used in calibrating the instrument;

Figure 33 is a perspective of the combination rheostat and switch in a different position;

Figure 34 is a bottom plan view, partly broken away in section, of the switch and rheostat of Figures 32 and 33;

Figure 35 is a wiring diagram;

Figure 36 is a perspective view of some of the parts of the recording mechanism, showing the use of means such as a cam to obtain a larger variety of patterns in the printed record than can be obtained in the arrangement of Figures 1-35;

Figure 37 is an enlarged elevation of the cam means of Figure 36; and

Figure 38 is a chart of the patterns obtained with the illustrated cam means.

The instrument selected for illustration comprises a casing 10, preferably in two parts hinged together, and within which is housed recording mechanism controlled according to the position of means such as a galvanometer 12 having a pointer 14.

As shown in the wiring diagram of Figure 35, the galvanometer is included in a potentiometer circuit including one connection 16 to a switch point 18, and another connection 20 leading through a rheostat 22 (see also Figures 2 and 34) and its slide contact 24 having a connection 26 to a switch contact 28.

The switch contacts 18 and 28 are connected respectively to contacts 30 and 32 leading respectively to rings 34 and 36 forming parts of a novel double multiple switch 38 which is preferably of the construction shown in Figure 31. The switch 38 has contact arms 40 and 42 of resilient metal mounted on and rotating with a common shaft 44, which shaft carries an indicator 46 moving over a dial 48, and which is driven by a driven gear 50 meshing with a smaller pinion 52 on a counter-shaft 54 (see Figure 4). A separator 41 of insulating material spaces the contact arms 40 and 42 apart, and holds them resiliently against their contacts. The spacer 41 has its opposite faces curved, so that the contact arms 40 and 42 may rock thereon to equalize the pressures on their ends. The contact arms 40 and 42 and the spacer 41 are keyed on the shaft 44, or else the shaft 44 is allowed to float axially, so as to equalize the pressures on the contact arms 40 and 42. The common center of parts 40, 41, and 42 is eccentric with respect to the axis of the shaft 44, the latter being arranged coaxially of the rings 34 and 36.

The contact arms 42 and 40, by wiping engagement with two annular series of contacts 56 and 58 (coaxially arranged relatively to rings 34 and 36) connected to opposite sides of pyrometers or other control devices 60, and by engagement as previously described with the rings 34 and 36, serve to connect the pyrometers successively to the recording and indicating mechanism described below, in synchronism with the indicator 46 and all other parts driven by or geared to the shaft 54.

The above construction gives a complete potentiometer circuit, with the galvanometer 12 controlling means (described below) for setting the rheostat 22—24 to balance the circuit. Preferably there is associated therewith the usual calibrating circuit including a standard cell 62, a battery or other source of current 64, a connection 66 from the cell 62 to a contact 68 connectible with a contact 18a connected to and electrically the same as the contact 18, suitable fixed resistances 70 and 72, and a calibrating rheostat 74 having a wiper arm 76. A space 65 is preferably provided in the casing for the battery or dry cell 64.

I prefer to simplify the construction, and provide a novel and improved combination switch rheostat, by mounting the wiper 76 (as shown in Figures 32 and 33) on a rotatable and axially movable plunger 78, having a knurled operating knob 80, and provided with collars 82 and 84 of conducting material insulated and separated by an insulating bushing 78a (see Figure 34) arranged to open and close contacts 30—28—32—18—68—18a by bridging engagement therewith as described above. Thus axial movement of plunger 78 connects the rheostat 74—76 alternatively to either the standard cell 62 or to the multiple switch 38, while rotation of the plunger changes the setting of the wiper 76 to adjust the rheostat 74 by comparison with the cell 62. Thus manipulation of a single control element 80 switches the instrument over for calibration and then operates the rheostat wiper 76 to make any necessary adjustment.

The deflections of the galvanometer needle 14, brought about as described above are arranged to control novel potentiometer-resetting mechanism and improved recording means, as shown in considerable detail in Figures 12 to 30 inclusive, and in Figures 5 to 11 inclusive, respectively.

The instrument is provided with a power-driven shaft 88 (Figures 4 and 12-16) driven by means such as worm gearing 90 from a synchronous or other constant-speed motor 92. The shaft 88 is provided with a worm meshing with a worm gear 94 on shaft 54, and therefore drives the above-described indicator 46 and the multiple switch 38. The shaft 88 is provided near its center with large and small cams 96 and 98.

The cam 96 engages a cam-roller on one arm of a bellcrank lever 100 pivoted on a bracket carried by the casing, and the other arm of which has a fork 102 embracing a roller on a slide 104 which is reciprocated fore and aft of the instrument as the cam 96 rotates.

The slide 104 is formed with a bent tongue 106, providing a cam surface engaging a roller on a lever 108 urged to move counterclockwise by gravity or by a suitable spring (not shown) or both in the form of an open pivoted framework shown in plan view in Figure 12. This lever or framework 108 cooperates with a stationary ledge or support 110, above the pointer 14, periodically to grip and hold and support the pointer 14, no matter what may be its angular position, as shown in Figures 16, 24, and 25. The pointer is shown released in Figures 14, 23, and 26.

Lifting the pointer against an abutment in this manner is advantageous, in that instead of bending the pointer the lifting does little more than take up the necessary clearance in the pointer bearings, and moreover does not put any pressure at all on the lower bearing which supports all of the weight of the pointer.

While the pointer is supported by the gripping mechanism or jaws 108—110, it is engaged between two inter-connected arms or feelers 112 and 114 shown in detail in Figure 17. These arms have parts such as depending flanges 116 and 118, respectively, projecting downwardly into arcuate slots 120 and 122 (Figures 12 and 13) in, or otherwise connected with, a horizontal rotatably-supported disk 124 shown in this particular arrangement formed with beveled edges.

The feelers 112 and 114 are urged together, to embrace pointer 14 between them, yieldingly by means such as a torsion spring 126 (Figures 14, 15 and 18), and are separated to release the pointer 14 by rollers 128 on the carriage 104 which engage the parts carrying fingers 116 and 118 at the rear ends of the feeler arms 112—114, at the extreme rearward end of the stroke of the feeler carriage 104, to force the front ends of the feeler arms 112—114 apart against the resistance of the spring 126.

Operated by the cam 98, in synchronism with the above-described parts operated by the carriage 104, is a lever 130 having at its end a fork operatively engaging a sleeve 132 slidable vertically on a shaft 134 rotatably supported in a suitable bearing 136. The shaft 134, the disk 124, the feelers 112—114, and the galvanometer 12, are preferably all arranged along a common axis, the disk 124 preferably being freely sleeved on the shaft 134.

The upper end of the shaft 134 is shown provided with a crosshead 139 secured thereto, and which has pivoted thereon a series of two or more clutch bellcrank levers 140, the lower arms of which are held by springs 142 against the sleeve 132. The upper ends of lever 140, in the illustrated arrangement in which disk 124 has a beveled edge, may have pairs of diverging clutch fingers engageable with the beveled edge of the disk 124. The springs 142 are shown piloted on pins carried by the crosshead 138. Thus it will be seen that cam 98 alternately clutches disk 124 to the shaft 134 and releases it therefrom.

The synchronization of these parts is illustrated in Figures 19 to 30. With the jaws 108—110 spread apart (Figures 19 and 23) and the pointer 14 released, the clutch levers 140 engage and hold the disk 124. At the next step, shown in Figures 20, 24, and 28, the carriage 104 moves forward, permitting lever or jaw 108 to rock upwardly to grip the pointer 14 against the stationary jaw 110; the feelers 112 and 114 are released to permit spring 126 to swing them together; and clutch levers 140 disengage the disk 124.

At the point in the cycle shown in Figures 21, 25, and 29, the feelers 112 and 114 have gripped the pointer 14 between them, the jaws 108—110 are still closed; and the clutch levers 140 are just starting to engage the disk 124.

It should be noted that slots 120 and 122 are so arranged, and are of such a length, that when pointer 14 is in a central position, as in Figures 12 and 13, and the feelers 112 and 114 engage it, the lugs 116 and 118 just reach the front ends of slots 120 and 122, whereas if the pointer 14 is at one side of center, as in Figures 19-21, one or the other of the feelers will move past center, so that its lug 116 or 118 will engage the end of its slot 120 or 122, and will shift the disk 124 through an angle in proportion to the distance pointer 14 is at one side of center, and in a direction determined by which side of center the pointer 14 is on. This has happened in Figures 21, 25, and 29, and disk 124 has been shifted to a corresponding new angular position.

In Figures 22, 26, and 30, carriage 108 has been moved back as clutch levers 140 engage the disk 124, so that feelers 112 and 114 are forced apart and jaws 108—110 are opened, while lug 116 (after traversing the length of its slot 120) has shifted disk 124 back to its initial position, thereby turning shaft 134 by power through an angle determined by the position of the pointer 14.

A series (e. g. fifteen) of the above-described cycles is carried out each time the apparatus is connected by the switch 38 to one of the pyrometers 60. Thus the switch connection may be maintained for 30 seconds, while each of the above cycles lasts two seconds. The printing or recording operation described below is carried out during the last (i. e. the fifteenth) of these cycles, and therefore does not take place until the adjustment of the pyrometer circuit and the potentiometer has been substantially completed.

The shaft 134 carries the rheostat 22, previously described, which is thus turned on each cycle relatively to its wiper 24 through an angle determined by the position of the pointer 14, thus adjusting the circuit so that the pointer 14 should swing back to its central or zero position unless there is some further change to be compensated for. By repeating this operation a number of times before recording, accuracy of the record is insured.

The shaft 134 also carries spools around which are wound operating cords 150 and 152. As shown in Figures 1 and 2, the cord 150 operates an indicator pointer 154 moving over a dial 156 to show the setting of rheostat 22—24.

Figure 4:
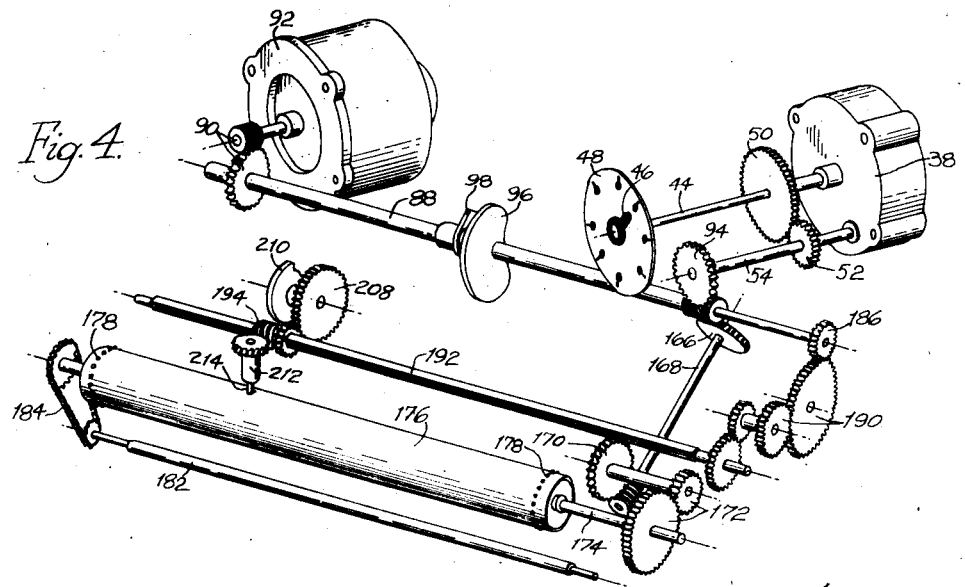
Figure 4 is a perspective of the operating parts of Figure 3.

The cord 152 is led over pulleys 158 at opposite sides of the casing, and is operatively connected at its ends to a shiftable carriage 160. The carriage 160 if desired may have an indicator 162 moving over a stationary scale 164, as shown in Figure 1. The carriage 160 and the recording mechanism it carries are shown in detail in Figures 5 to 10, while the associated chart-driving mechanism is shown in Figures 3 and 4.

The power-driven shaft 88 is provided at one end with a worm driving a worm gear 166 on a shaft 168 driving, through another worm and a worm gear 170, reducing gearing 172 connected to a shaft 174 carrying the platen 176 having the usual drive pins 178 for the chart 180 (Figure 2). A chart-feeding shaft 182 is shown connected to shaft 174 by a sprocket chain 184.

The shaft 88 also has at one end a pinion 186 driving a system of intermeshing gears 190 which drives a squared shaft 192 slidably and drivably engaging a sleeve 194 on carriage 160, or operating other means for operating the mechanism on the carriage regardless of the position of the carriage. The squared shaft 192, and a shaft 196 carrying two of the gears 190 at one end, support the carriage 160 in a manner permitting it to be shifted axially of the shafts by the shaft 134, through the medium of the cord 152 or an equivalent connection.

The shaft 192 has at its ends externally-cylindrical portions or sleeves 198 journaled in arms 200 pivoted on the shaft 196, so that the carriage 160 with all its associated parts may be swung upwardly out of the way, as shown in Figure 8, to afford access to a ribbon 202 by means of which a record is printed on the chart 180. The scale 164 is mounted on the ends of the arms 200. The carriage 160 has a semicylindrical socket 204 which engages a shaft or stop rod 206 to determine the active position of the carriage.

The driven sleeve 194 on the carriage is externally formed at one end as a pinion driving a gear 208 which has rigid therewith a cam 210. The remainder of the sleeve 194 is formed as a worm driving a gear formed on the upper end of a vertical sleeve 212 journaled in the carriage 160. Vertically reciprocating in the sleeve 212 is a headed printing plunger 214 (Figure 9) having a pin 216 sliding in a vertical slot in sleeve 212 to key the sleeve and the plunger together.

The lower end of the plunger 214 is formed in a suitable non-symmetrical shape, which will print on the chart a corresponding character when depressed against the ribbon 202. As shown, the character has a round body with a radial projection, forming roughly a sort of arrow. Preferably the indicator 46 is given the same shape, and associated with the position numerals 218 on the dial 48 there may be similar characters 221 in different angular positions corresponding to the different positions of the plunger 214.

A spring 220 between the top of sleeve 212 and the head of plunger 214 urges the plunger upwardly. The plunger is depressed by a percussive blow from a hammer having a cup-shaped head 222 enclosing spring 220 and the upper part of plunger 214, and which is shown formed integral with a lever 224 pivoted on the carriage 160.

The lever 224 is lifted gradually by the cam 210, and then allowed to drop suddenly and percussively against the head of the plunger 214. The inertia is sufficient to depress the plunger 214 to print its character, but immediately thereafter the spring 220 lifts the plunger 214 away from the chart.

In operation, all the parts are driven in synchronism by the motor 92. Each pyrometer 60 corresponds to one angular position of the plunger 214, the plunger having eight different positions corresponding to eight different pyrometers in the illustrated instrument.

As the instrument is connected in succession to the pyrometers by the switch 38, the plunger 214 assumes its corresponding positions, and for each such connection the instrument goes through one series of cycles of adjustment, with a recording cycle during the last one of the series of adjustment cycles.

In each such series of adjustment and recording cycles, pointer 14 assumes a position which is determined by the particular pyrometer 60 to which it is connected, and through the feelers 112—114 determines the angular movement of shaft 134. This in turn sets the indicator 154, and shifts the carriage 160 to its proper position before the plunger 214 is depressed to make an imprint on the chart.

It will be seen from Figure 1 that the eight curves thus outlined on the chart are readily distinguishable because of the different angular positions of the characters formed by the plunger 214.

Where a greater number of pyrometers are used, the modification illustrated in Figures 36, 37, and 38 may be used. In this modification, the squared shaft 192 (and therefore the plunger 214) is turned by a pinion 250 operated by a rack or the like 252. The rack 252 is shifted to different positions by a double-phase cam 254 engaging a roller on the end of an arm 256 rigid with the rack 252, the roller being held against the cam by a spring 260. The cam 254 is driven by the gearing 190, in synchronism with the switch 38, the cam being turned through one-half a revolution for each full revolution of the switch. Thus alternate characters (i. e. characters in the $x$ and $y$ phase of the cam) in each series corresponding to the respective pyrometers may, if desired, be at different angles, permitting various combinations to be used. Figures 37 and 38 show 16 such combinations, lettered from "A" to "P", and corresponding to 16 pyrometers.

While illustrative constructions have been described in detail, it is not my intention to limit the scope of my invention to those particular constructions, or otherwise than by the terms of the appended claims.

I claim:

1. Recording mechanism for a potentiometer or the like having means to connect said mechanism successively to different ones of a series of control devices, comprising a device for printing a non-symmetrical character, means for turning said device to different angular positions for the different control devices respectively when connection is made thereto, and means for shifting said printing device under the control of the particular control device which is connected.

2. Recording mechanism for a potentiometer or the like having means to connect said mechanism successively to different ones of a series of control devices, comprising a device for printing a non-symmetrical character, and means for turning said device to different angular positions for the different control devices respectively when connection is made thereto.

3. A recording instrument having a plurality of input connections, a printing device for forming a non-symmetrical character and which may assume a corresponding plurality of angular positions, means for shifting the position of said printing device in accordance with the input of said connections, and means for turning the printing device to different positions and synchronously connecting the shifting means to different ones of the input connections.

4. A recording instrument having a plurality of input connections, a printing device for forming a non-symmetrical character and which may assume a corresponding plurality of angular positions, a shaft which operates the printing device to cause it to print, means for shifting the position of said printing device along said shaft in accordance with the input of said connections, and means for turning the printing device to different positions and connecting the shifting means to different ones of the input connections in synchronism with the operation of said shaft.

5. Printing mechanism for a recording device comprising an oscillatable carriage, a stop for limiting the oscillation of the carriage downward, a spring-upheld printing plunger mounted on the carriage, an inertia member pivoted on the carriage at one end and engaging the plunger at its other end for momentarily depressing said plunger, and a cam for lifting the inertia member and then dropping it suddenly to operate said plunger.

6. Printing mechanism for a recording instrument comprising a shaft having a carriage mounted thereon and movable lengthwise thereof, a reciprocable printing plunger mounted in said carriage, means for periodically reciprocating said plunger including an inertia lever pivoted on the carriage in a position to contact said plunger, and a cam mounted on said carriage and arranged to lift the inertia lever and then drop it suddenly on the plunger, means on the carriage for rotating the plunger about its longitudinal axis into different angular positions, and power means for operating said cam and plunger-rotating means in any position of the carriage along said shaft.

7. Printing mechanism for a recording instrument comprising a shaft having a carriage mounted thereon and movable lengthwise thereof, a reciprocable printing plunger mounted in said carriage, means for periodically reciprocating said plunger, means on the carriage for rotating the plunger about its longitudinal axis into different angular positions, and power means for operating said plunger-reciprocating means and said plunger-rotating means in any position of the carriage along said shaft.

8. Printing mechanism for a recorder comprising a power-rotated sleeve, a central plunger keyed in said sleeve for rotation therewith and reciprocable lengthwise therein and having at its lower end a non-symmetrical character, and means acting on the upper end of the plunger to reciprocate it while in any one of a plurality of angular positions.

9. An instrument comprising an indicator part, power-operated means for periodically holding and supporting said part in any of its various positions, a rotatable element adjacent said indicator part and which is formed with a beveled edge, power-operated feeler means associated with said rotatable element and operated to engage said indicator part when it is gripped by said means, means operated by said feeler means to turn the rotatable element through an angle corresponding to the position of said indicator part, rotatable operated means comprising bellcrank clutch levers having diverging portions adapted to seat against and grip the beveled edge of said rotatable element, and means for rocking said clutch levers in synchronism with the operation of said feeler means.

10. An instrument comprising an indicator part, power-operated means for periodically holding and supporting said part in any of its various positions, a rotatable element adjacent said indicator part, power-operated feeler means associated with said rotatable element and operated to engage said indicator part when it is gripped by said means, means operated by said feeler means to turn the rotatable element through an angle corresponding to the position of said indicator part, rotatable operated means comprising bellcrank clutch levers adapted to grip said rotatable element, and means for rocking said clutch levers in synchronism with the operation of said feeler means.

11. A recording instrument comprising an indicator part, power-operated means for periodically holding and supporting said part in any of its various positions; a rotatable element adjacent said indicator part, power-operated feeler means associated with said rotatable element and operated to engage said indicator part when it is gripped by said means, means operated by said feeler means to turn the rotatable element through an angle corresponding to the position of said indicator part, exhibiting mechanism having a rotatable operating member and means for periodically connecting said member to said rotatable element and comprising bellcrank clutch levers adapted to grip said rotatable element, and means for rocking said clutch levers in synchronism with the operation of said feeler means.

GEORGE W. GRISDALE.